(12) United States Patent
Jennings

(10) Patent No.: US 8,894,514 B2
(45) Date of Patent: Nov. 25, 2014

(54) ARENA BASEBALL GAME SYSTEM

(71) Applicant: James Edward Jennings, Superior, CO (US)

(72) Inventor: James Edward Jennings, Superior, CO (US)

(73) Assignee: James Edward Jennings, Superior, CO (US)

( * ) Notice: Subject to any disclaimer, the term of this patent is extended or adjusted under 35 U.S.C. 154(b) by 0 days.

(21) Appl. No.: 13/572,679

(22) Filed: Oct. 25, 2012

(65) Prior Publication Data

US 2014/0121792 A1    May 1, 2014

(51) Int. Cl.
| | | |
|---|---|---|
| *A63F 13/00* | (2014.01) |
| *A63F 9/24* | (2006.01) |
| *A63B 71/10* | (2006.01) |
| *A42B 3/00* | (2006.01) |
| *A63B 67/00* | (2006.01) |
| *G06F 17/30* | (2006.01) |
| *G06F 3/00* | (2006.01) |
| *A63B 71/02* | (2006.01) |
| *A63B 71/06* | (2006.01) |
| *A42B 3/04* | (2006.01) |

(52) U.S. Cl.
CPC . *A63F 9/24* (2013.01); *A63B 71/10* (2013.01); *A42B 3/00* (2013.01); *A63B 67/002* (2013.01); *G06F 17/3002* (2013.01); *G06F 3/00* (2013.01); *A63B 71/022* (2013.01); *A63B 2071/0625* (2013.01); *A63B 2071/063* (2013.01); *A63B 2210/50* (2013.01); *A63B 2220/12* (2013.01); *A63B 2220/805* (2013.01); *A63B 2220/806* (2013.01); *A63B 2220/808* (2013.01); *A63B 2220/836* (2013.01); *A63B 2225/15* (2013.01); *A63B 2225/20* (2013.01); *A63B 2225/50* (2013.01); *A63B 2225/54* (2013.01); *A63B 2230/06* (2013.01); *A63B 2230/50* (2013.01); *A63B 2243/0004* (2013.01); *A42B 3/042* (2013.01)
USPC .................................. 473/468; 473/499; 2/63

(58) Field of Classification Search
CPC ........ A42B 3/00; A42B 3/0433; A63B 71/00; A63B 69/0002; A63B 67/002; H04B 2001/3866
USPC ....... 381/376, 367; 479/430; 463/3; 473/415, 473/451, 468, 499
See application file for complete search history.

(56) References Cited

U.S. PATENT DOCUMENTS

| | | | | |
|---|---|---|---|---|
| 2005/0001728 A1* | 1/2005 | Appelt et al. | ............... | 340/573.1 |
| 2005/0248718 A1* | 11/2005 | Howell et al. | ................... | 351/41 |
| 2008/0130272 A1* | 6/2008 | Waters | .......................... | 362/106 |
| 2010/0053331 A1* | 3/2010 | Accurso | ........................ | 348/157 |
| 2010/0110368 A1* | 5/2010 | Chaum | .......................... | 351/158 |

* cited by examiner

*Primary Examiner* — James S McClellan
*Assistant Examiner* — Kevin Carter

(57) ABSTRACT

Arena Baseball Game system method of play includes base excessive force, no collision contact slide zones and describes a protective helmet apparatus for use by baseball fielders. The protective sport television or radio audio device means of communication equipped with display, GPS, infrared scan and sensors to monitor performance and physiological parameters. In operation one or more infrared sensor sits against skin of a user to measure his or her heart rate. In response to oscillation translation and/or rotation of the electronic sport device, portions of forces induced by the mass are transferred to the piezoelectric elements. Electrical energy output by these piezoelectric elements is received in a power controller and can be applied to the battery as self charging.

2 Claims, 8 Drawing Sheets

PRIOR ART          FIG. 1

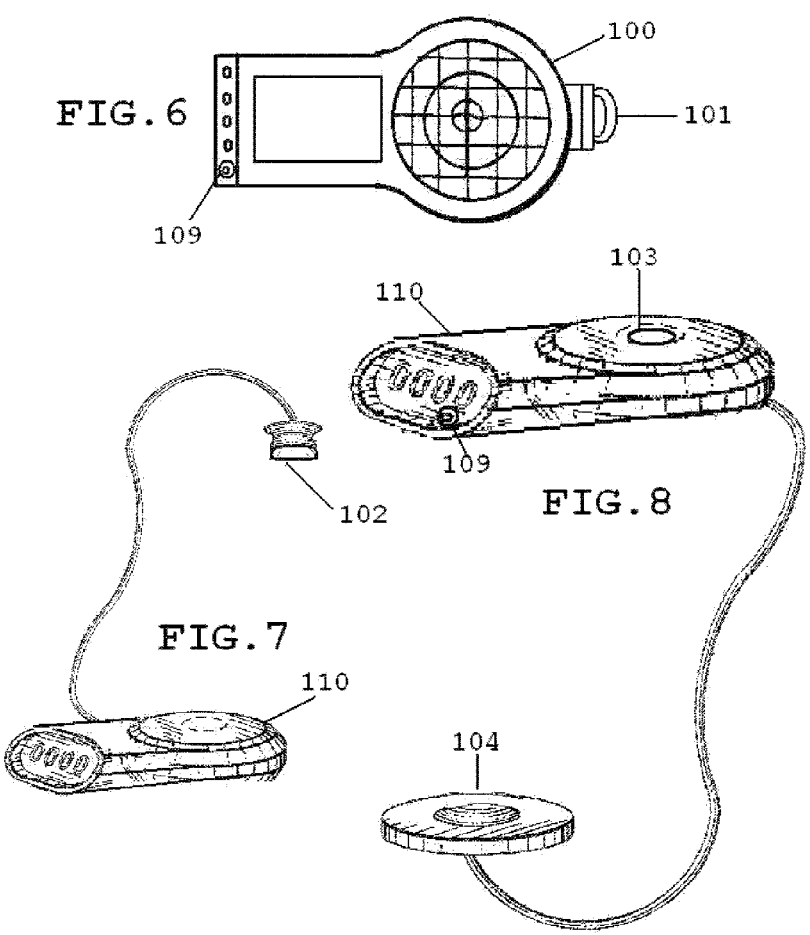

ARENA BASEBALL GAME SYSTEM

CROSS REFERENCE TO RELATED APPLICATIONS

NONE

BACKGROUND OF THE INVENTION

1. Field of the Invention

This Arena Baseball Game invention pertains to games and more particularly to an improved baseball helmet and interactive synch system for using a microphone smart device object at a sporting event. The information in this section deals exclusively with communication between the player to player and the coaches. Other types of signals, such as signals between the coach, catcher and infielders, will be discussed in later sections.

The present invention can include systems and methods for integrating sensors for tracking a user's performance metrics into media devices and accessories therefor, thereby reducing or eliminating the need for additional independent monitoring devices. In one embodiment of the present invention, headset also can be equipped with one or more physiological sensors. For example, sensors can include one or more infrared photodetectors for tracking the user's temperature, heat flux, and heart rate.

It also is known to provide such headsets with connectors to allow their rechargeable batteries to be charged. In some cases, the connector is a Universal Serial Bus (USB) connector, allowing the headset to be charged by plugging it into the USB port of a computer or other device.

2. Description of the Related Art

Putting microphones directly on players may allow viewers to hear the players talking; however, these microphones will allow the players and coaches to convey strategies to fans. Wireless headsets for devices with audio inputs and outputs are well known. For example, headsets using the low-power spread-spectrum protocol known as BLUETOOTH® are commonly used with, e.g., mobile telephones, media players, electronic game consoles, radios and television sets.

Clear communication between the pitcher and catcher is vitally important to successful baseball. Obviously the catcher and pitcher cannot verbally communicate, so, they must communicate through a series of hand signals. The most common way for the catcher to relay a sign to the pitcher, or call a pitch, is using the fingers of his throwing hand. The signal is given from the squatting position and the hand should be positioned between the legs and be back up against or close to your cup. Watch that your hand is not too low or your signs will be visible under your body.

In the past, television broadcasters have put microphones around the perimeter, but outside of, the playing field. These microphones can pick up spurious crowd noise as well as noise from players when the players are not on the field. However, these microphones do not reliably pick up sounds from the playing field. Thereby, there is a need to allow viewers and listeners to hear more sounds from the playing field so that they feel closer to and more involved with the game.

Thus, there is a need for a system that uses microphones within the playing field that do not interfere with the play or view of the game, and that can reliably pick up and transmit sounds from the playing field.

Combinations of communication devices U.S. Pat. No. 7,971,782 and sport interaction are disclosed in WO/2008/118261A1, US20090268921, US20100045241, U.S. Pat. No. 6,902,513 to Dorogusker; U.S. Pat. No. 5,963,849 to Hill; and U.S. Pat. No. 3,621,488 to Gales. Lastly, design helmets U.S. Pat. Nos. D332,507, D620,203 or helmets with headsets in U.S. Pat. Nos. 5,003,631 and 6,732,381. Agnoff discloses an Oscillating watch winder in U.S. Pat. No. 6,543,929, Morrissey U.S. Pat. No. 4,605,226 cap and shield.

As illustrated by a large body of prior art, including the above-noted patents, and a large number of commercial devices, efforts are continuously being made in an attempt to improve helmets, headsets and their methods of fabrication. Nothing in the prior art, however, suggests the present inventive combination of materials and method steps as herein described and claimed. The present invention achieves its purposes, objects and advantages over the prior art through a new, useful and unobvious combination of components and method steps which improve safety, comfort and noise abatement performance.

Therefore, it is an object of this invention to provide a helmet formed of a rigid shell and, internally thereof, equipped with a communication device.

It is still a further objection of this invention to size and position headsets in helmets to accommodate the individual needs of the wearer.

It is a further object of the present invention to fabricate helmets with headsets which abate the maximum amount of noise and provide the greatest amount of safety and comfort to the user.

PRIOR ART

Quartz crystals have been in regular use for many years to give an accurate frequency for all radio transmitters, radio receivers and computers. Their accuracy comes from an amazing set of coincidences: Quartz—which is silicon dioxide like most sand—is unaffected by most solvents and remains crystalline to hundreds of degrees Fahrenheit. The property that makes it an electronic miracle is the fact that, when compressed or bent, it generates a charge or voltage on its surface. This is a fairly common phenomenon called the Piezoelectric effect. In the same way, if a voltage is applied, quartz will bend or change its shape very slightly.

If a bell were shaped by grinding a single crystal of quartz, it would ring for minutes after being tapped. Almost no energy is lost in the material. A quartz bell—if shaped in the right direction to the crystalline axis—will have an oscillating voltage on its surface, and the rate of oscillation is unaffected by temperature. If the surface voltage on the crystal is picked off with plated electrodes and amplified by a transistor or integrated circuit, it can be re-applied to the bell to keep it ringing.

The electronics of the watch initially amplifies noise at the crystal frequency. This builds or regenerates into oscillation—it starts the crystal ringing. The output of the watch crystal oscillator is then converted to pulses suitable for the digital circuits.

Advantages/Disadvantages

In baseball, known collectively as a leisure sport albeit time consuming mound visits are commonplace. The use of this arena baseball system unit will break up the necessity for mound visit delay.

There are three main methods that I have seen and used for calling signs in a game. The first way was discussed earlier in the Signals section and involves using fingers to call pitches and locations. Another way to give signs is to combine hand signals and body signals. For example: I may touch a part of my equipment with my signal hand (mask, chest, thigh) and then put down a series of finger signals in the normal position. Depending what part of my equipment I touched will affect what those hand signals mean. This system is for older players and is usually only used with a runner on second base. The third method is using only body signals. This method is actually very simple to use and is extremely effective for pitchers with vision problems or with poor lighting during night games. An example would be: Touching your mask=fastball, touching your chest=curve ball, and touching your knee=change up.

Other signals that are relayed to the pitcher through signals from the catcher include: pitch outs; pick offs, holding runners close, and the shake off. Most of these decisions and signals will be made by your coach or infielders and given to you for you to relay Situations and Plays, throwing defensively.

To obtain information about the user's heart rate, the user may strap a heart rate sensor to his chest and a receiver for receiving data from the heart rate sensor to his wrist. Disadvantageously, the user can become very uncomfortable during his fitness routine due to the number of devices the user has attached to his body and clothing.

Advantageously, such integration of sensors can be desirable because it requires no additional effort by the user to use them. As used herein, performance metrics can include physiological metrics (e.g., heart rate, EKG, blood oxygen content, temperature, heat flux, etc.) and non-physiological indications of performance (e.g., distance covered, pace, etc.).

This sequence of oscillations causes the rotor within watch to spin rapidly thereby winding the watch in a manner closely simulating the spinning of the rotor that occurs during normal winding of the watch when the watch is worn by a user. Due to the forces that are exerted, the rotor spins around the watch shaft during the oscillations, as opposed to the partial rotation observed in prior art mechanisms. Therefore, the time required to wind the watch, and the energy required, is substantially reduced. Moreover, since the rotor is spinning about the shaft, as opposed to merely being held in a downward position while the watch is rotated, winding more closely approximating the design mechanism is achieved, thereby putting less wear on the watch.

It is contemplated that during a baseball game all players could utilize the principles of the present invention for various alignments, pitch and play selection. In one embodiment, every player transmits an RF signal on one frequency. The transmitter frequencies are selectable from a predetermined set of frequencies. A mixer can be used to choose which, if any, of the audio signals are to be inserted into the broadcast signal for television/radio broadcast.

These purposes, objects and advantages should be construed as merely illustrative of some of the more prominent features and applications of the present invention. Many other beneficial results can be obtained by applying the disclosed invention in a different manner or by modifying the invention within the scope of the disclosure. Accordingly, other purposes, objects and advantages as well as a fuller understanding of the invention may be had by referring to the summary herein mentioned and detailed description describing the preferred embodiments of the invention, in addition to the scope of the invention, as defined by the claims, taken in conjunction with the accompanying drawings.

SUMMARY OF THE INVENTION

The present invention is directed to overcome the disadvantages of the prior art. Thus, the present invention provides for a system for using a sport device with microphone within a baseball helmet. The baseball helmet has an outside surface and a channel along a portion of the inside surface. The microphone is located in the channel. The channel is at least partially filled with a non-noisemaking substance. In one embodiment, the non-noisemaking substance is silicone. Placing the sport device with microphone in a channel on the inside surface of the helmet helps prevent the microphone from detecting noises due to the crowds outside of the helmet when the player participates in game.

The present invention is defined by the appended claims with features of the specific embodiments illustrated in the attached figures. For the purposes of summarizing the invention, the invention may be incorporated into a helmet. The baseball helmet includes a shell, a pad inside the shell. The channel housing the microphone is in the shell. The system also includes a transmitter which is connected to the microphone. In one embodiment, the system includes a protective box secured to the baseplate and a cover removably attached creating a protective box. Sealing material is placed between the box and the protective helmet shell. The transmitter is housed within the protective box such that the transmitter is protected from moisture and dust.

The sport device is an ergonomic, lightweight handheld Bluetooth, Class I Barcode Scanner, designed for all-day everyday use. With a USB cable attached, it operates as a plug and play barcode scanner. Without the USB cable it functions as a standalone barcode recorder. As a Bluetooth device, it can be programmed as a Master or Slave device to allow communication between PC, mobile phone, PDA or Apple iPhone or iPad. Once the Bluetooth connection has been established with a PC, an iPad, or an iPhone, the barcode data can easily be entered into word processing software, spreadsheets, emails, or text messages. Its built-in rechargeable battery pack is recharged via any USB port. The sport device is a means of attributing or identifying scanner barcode electronic exercise equipment.

According to the invention, a single piece of baseball equipment is designed to avert, reduce or minimize the injuries just described. This equipment is a specially designed helmet intended to protect the front parts of the skull, particularly the face. The helmet is intended for use by players when fielding baseballs. It can also be adapted, in another embodiment, for use by coaches or players while fielding or batting.

These and other objects and advantages of the invention will appear more clearly from the following description in which the preferred embodiment of the invention has been set forth in conjunction with the drawings.

BRIEF DESCRIPTION OF THE DRAWINGS

FIG. 6 is a top plan view of a sport device in accordance with an embodiment of the present invention;

FIG. 7 is a perspective view of a sport device in accordance with another embodiment of the present invention;

FIG. 8 is a perspective view of a sport device in accordance with yet another embodiment of the present invention;

DETAILED DESCRIPTION

This sequence of oscillations causes the rotor within sport device to spin rapidly thereby winding the watch in a manner closely simulating the spinning of the rotor that occurs during normal aerobic activity when the sport device is worn by a user. Due to the forces that are exerted, the rotor spins around the sport device shaft during the oscillations, as opposed to the partial rotation observed in prior art mechanisms. Therefore, the time required to charge the sport device, and the energy required, is substantially reduced. Moreover, since the rotor is spinning about the shaft, as opposed to merely being held in a downward position while the sport device is rotated, recharging more closely approximating the design mechanism is achieved, thereby putting less wear on the sport device.

Figure 1:
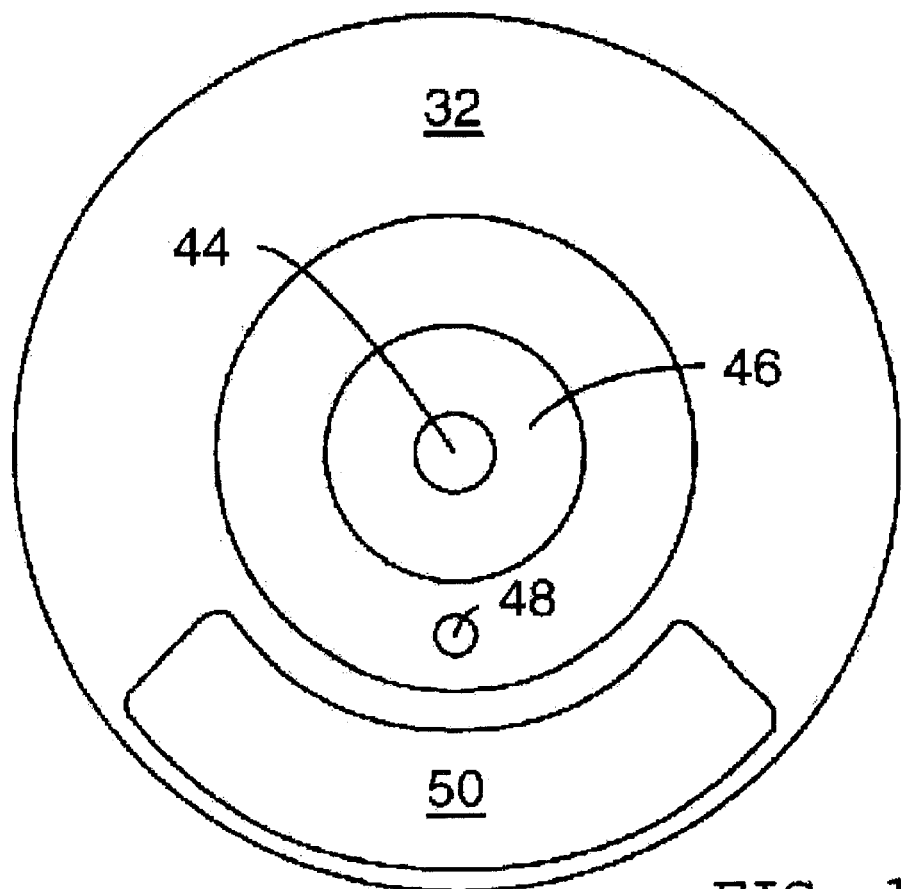
FIG. 1 Prior Art depicts rear view of the watch carrier according to the prior invention.

PRIOR ART FIG. 1 Rear face 32 of watch carrier includes a central bore 44 for receiving shaft. Bore 44 is surrounded by bearings 46 or a friction reducing bushing, so that watch carrier is freely rotatable on shaft. A torque arm engaging projection in the form of pin 48 extends rearwardly from rear face 32 into the pathway of torque arm. Pin 48 is offset in a given direction from shaft. A counterweight 50 is also mounted on rear face 32 in the same given direction. Preferably, watch is mounted in watch carrier so that watch is in an upright position facilitating viewing when the given direction is downward, i.e., when counterweight 50 is beneath shaft.

Figure 2:
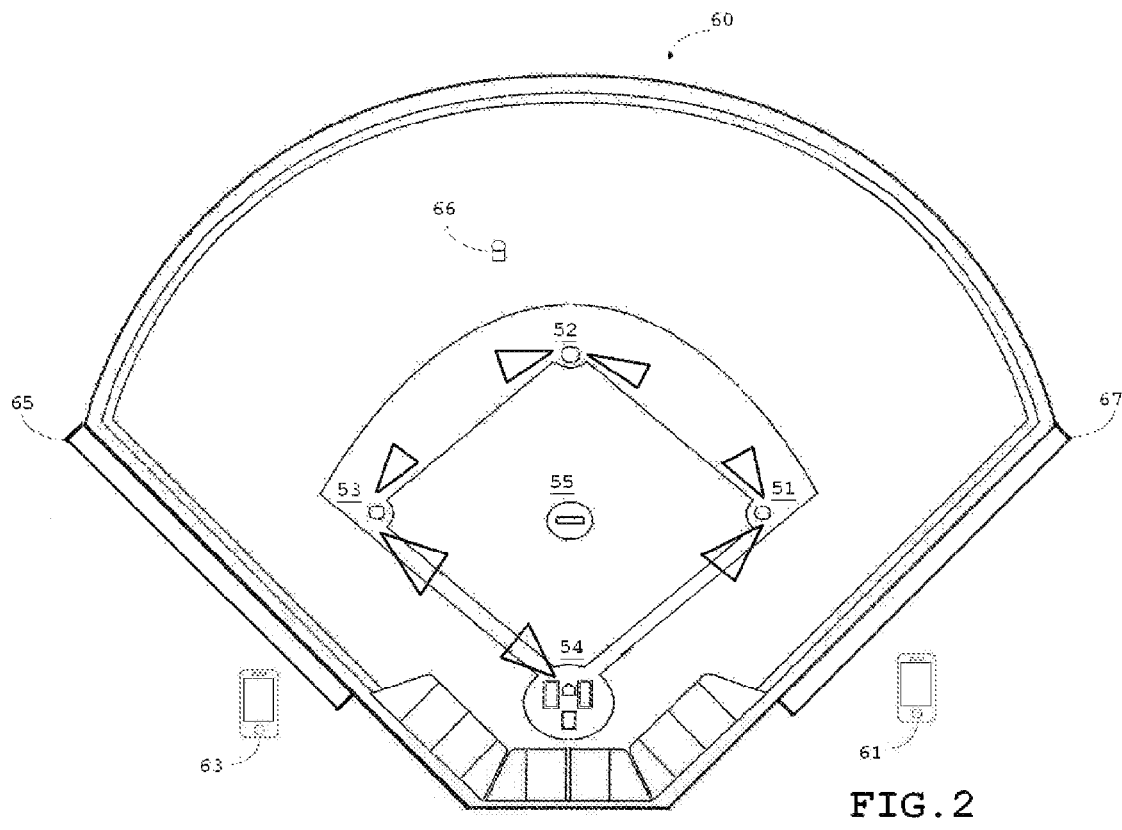
FIG. 2 is a top plan view of the playing arena of the present invention.

Reference is made first to FIG. 2 which is a top plan view of the playing arena of the first preferred embodiment of the present invention. FIG. 2 discloses playing arena 60 as comprising a generally diamond or oval enclosure surrounding a playing field and, in the preferred embodiment, providing adequate seating for an array of fans surrounding playing field 2. In the preferred embodiment of the present invention it is anticipated that the fan audience seating arrangement for the Arena Baseball game will be generally smaller than that of existing Major League Baseball (MLB) fields. One object of the present invention is to create more of an audience participatory environment for the fans attending the baseball game. Towards such end, the collapsible retractable enclosure defining playing arena 60 should be smaller than a typical open air baseball stadium, but somewhat larger than the typical closed basketball arena.

Further disclosed in FIG. 2 (in this top plan view) are outfielder with sport device 66, first base side dugout enclosure 67, and third base side dugout enclosure 65. The specific structure of each of these devices is described in more detail below. Traversing the entire playing field 60 is a communication network data manager 69. Coaching and trainers 61,63 are supported by constant contact and performance graphic 320 data derived form sport device 66 in this first preferred embodiment by a voice 308 text arena baseball system. Comprising an arching communication conveying through the exchange of thoughts, messages, or information, as by speech 308, visuals 316, signals, writing, or behavior. Data Manager computer 69 support component extending from behind home plate monitors info from the infielders and outfielders (sport device 66 in the vicinity of center field) and relays the filtered "sounds of the game" delayed.

Associated with what is the equivalent of the infield in the standard American Baseball field configuration are the usual home plate, first base, second base, and third base. Defined in FIG. 2 and utilized as part of the method of play for the Arena Baseball game, are home slide zone 54, first base slide zone 51, second base slide zone 52, and third base slide zone 53. Positioned in the center of the infield area is pitcher's mound 55.

Overall, the components of the Arena Baseball game structure of the present invention, shown generally as the playing arena 60 of FIG. 2, are structured to be similar to standard American Baseball, but fully enclose the playing area so as to allow the audience to position themselves very close to the activity within the playing area. The various surrounding enclosures and retractable netting components allow for the continuous play of the Arena Baseball game, according to the various rules described in more detail below, especially those relating to the play of balls off of the walls and collapsible retractable ceiling enclosure components.

Figure 3:
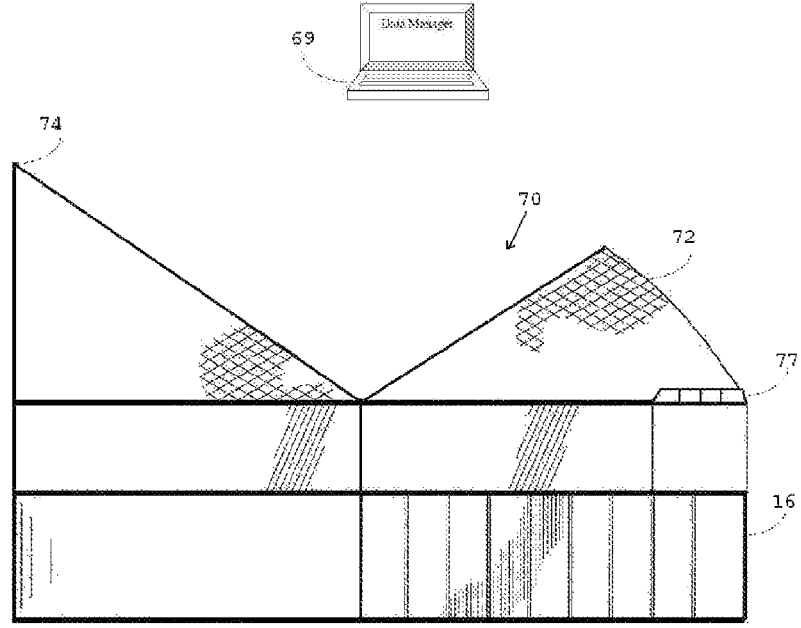
FIG. 3 is a side elevational view of the playing field enclosure of the present invention.

Reference is next made to FIG. 3 which is a side elevational view of the playing arena of the second preferred embodiment of the present invention. In this view of FIG. 3, playing arena is again shown to be framed as a clam top retractable outfield enclosure 74 and home plate backstop enclosure with louver overhang 77. Likewise, first base side enclosure and third base side enclosure 16 are disclosed with their elevational configuration. Retractable netting 72 is shown to comprise an array of net awning panels forming the upper sections of the sidewalls and the arching sections of the ceiling for the overall collapsible enclosure.

Figure 4:
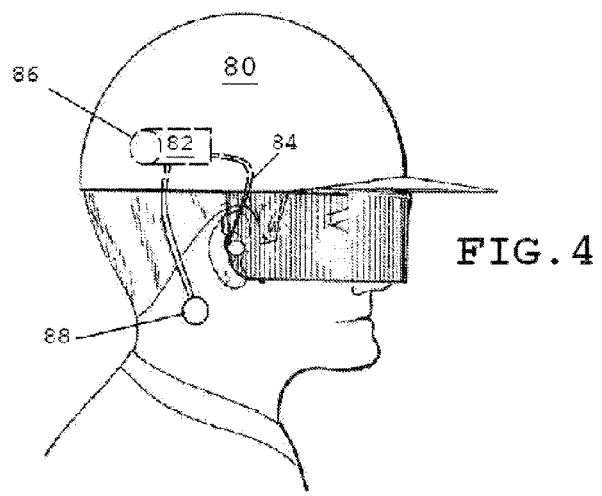
FIG. 4 is a perspective view of the sport device, helmet and user's head.

FIG. 4 Helmet 80 smart device Sport device 82 also includes speaker system 86 for distributing audio information from earphone 84. Speaker system 86 can include an audio 89 port at the end of the earbud and a speaker disposed adjacent the audio port 89. The audio port may be covered with a grill 87. Sport device 82 is shown by dotted lines in FIG. 4 because they are not visible when looking at helmet 80 protective mask 81 from a perspective view. FIG. 4 illustrates a physiological monitoring system. A user may use conventional heart rate monitoring system to monitor the user's heart rate, e.g., while the user is performing an exercise routine. Conventional heart rate monitoring system can be equipped with heart rate sensor 88, which the user can attach onto the user's neck using a sticky pad. Heart rate monitoring system device 82 also can have receiver, which can accept wireless data signals transmitted from heart rate sensor and display such information for the user's consideration.

Figure 5:
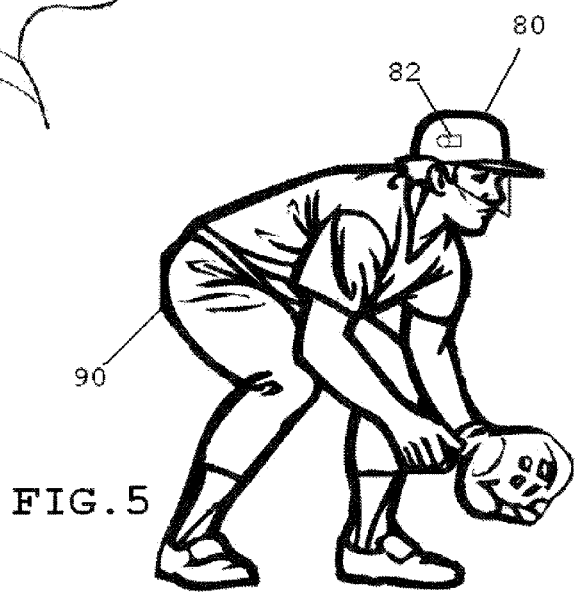
FIG. 5 is a perspective view of the sport device, helmet and fielder.

FIG. 5 illustrates a wireless helmet 80 sport device 82 diagram which may generate an audio representation of a heart rate, in accordance with the method of the invention Changes in light are measured through an user's skin. For example, changes in light are measured using an infrared sensor 88 unit. After changes in light are measured through a user's skin, a heart rate is calculated using input signals from the sensor unit and the micro-processor based on the changes in the light measured by the sensor unit. After the heart rate is calculated in the step, the micro-processor generates output signals that are transmitted to the output unit where the output signals are played to generate an audio signal representative of the heart rate.

The FIG. 5 designated fielder 90 or hitter for the pitcher is available for fielding at least one out per inning or a cumulative number for the game duration. In Major League Baseball, the designated hitter is a hitter who does not play a position, but instead fills in the batting order for the pitcher. DH at the MLB level may be used for the pitcher only. In any case, use of the DH is optional, however, the manager must designate a DH prior to the start of the game; failure to do so forfeits the right to use the DH, and the pitcher must then take his turn at bat. The designated fielder 90 may play a field position, he may only be replaced by another player not currently in the lineup and increases the defensive alignment by one. However, the designated fielder 90 may become a position player at any point during the game; if he does so, his team forfeits the role of the designated hitter, and the pitcher or another player (possible only in case of a multiple substitution) must bat in the newly opened spot in the batting order. Helmet 80 protective mask 81 sport device 82 also includes a communication terminal for communicating with a host device. The communication terminal may be configured for wired or wireless connections.

FIGS. 6&7 illustrates an earbud 102 of a headset having one or more integrated physiological sensors 88,104 in accordance with one embodiment of the present invention. Earbud 102 can have housing 110 and internal cavity 111. Internal cavity 111 can be bisected by internal wall 208 into separate acoustical chambers. Speaker 86,210 can be positioned within internal cavity 111 (e.g., mounted onto internal wall 208) so that sound waves emanating from the speaker 210 are directed out of acoustical aperture 109. Speaker 210 can be coupled to wires 214 that transmit audio signals from an electronic device. FIG. 6 Sport device 100 removed or stand alone can be configured as a small compact unit with a simple earpiece 84 that can be placed in a user's ear. The FIG. 7 sport device 100 can include a primary housing 110 and an earphone 102 that extends from the primary housing. Earphone 102 can fit into the user's ear thereby placing the primary housing next to the user's face. Earphone 102 alone may retain sport device 100 in the user's ear, or a retaining arm—which may be curved—may be provided that wraps around the user's ear or the user's head. Each of these members can surround and protect various internal components and can also support thereon various external components associated with operating sport device 100. The components may be a plurality of electrical components that provide specific functions for the electronic device. For example, the components may generally be associated with generating, receiving, and/or transmitting data associated with operating the device. Similarly, any connector (USB 350) may be covered by a removable cap 101 or key chain attachment.

FIG. 8 Sport device 100 also includes one or more input mechanisms for providing sensor 104, 312 inputs to the smart device. The input mechanism may be placed at primary housing 110 and/or at earphone 102. The input mechanisms may be widely varied and may include for example sensors 104, 312, slide switches, keyboard 319, depress able buttons 317, dials, wheels, navigation pads, touch 302 pads, and/or pointing devices 303. For aesthetic reasons, the input mechanism may be placed at a select location as an optical camera 103, 304.

Figure 9:
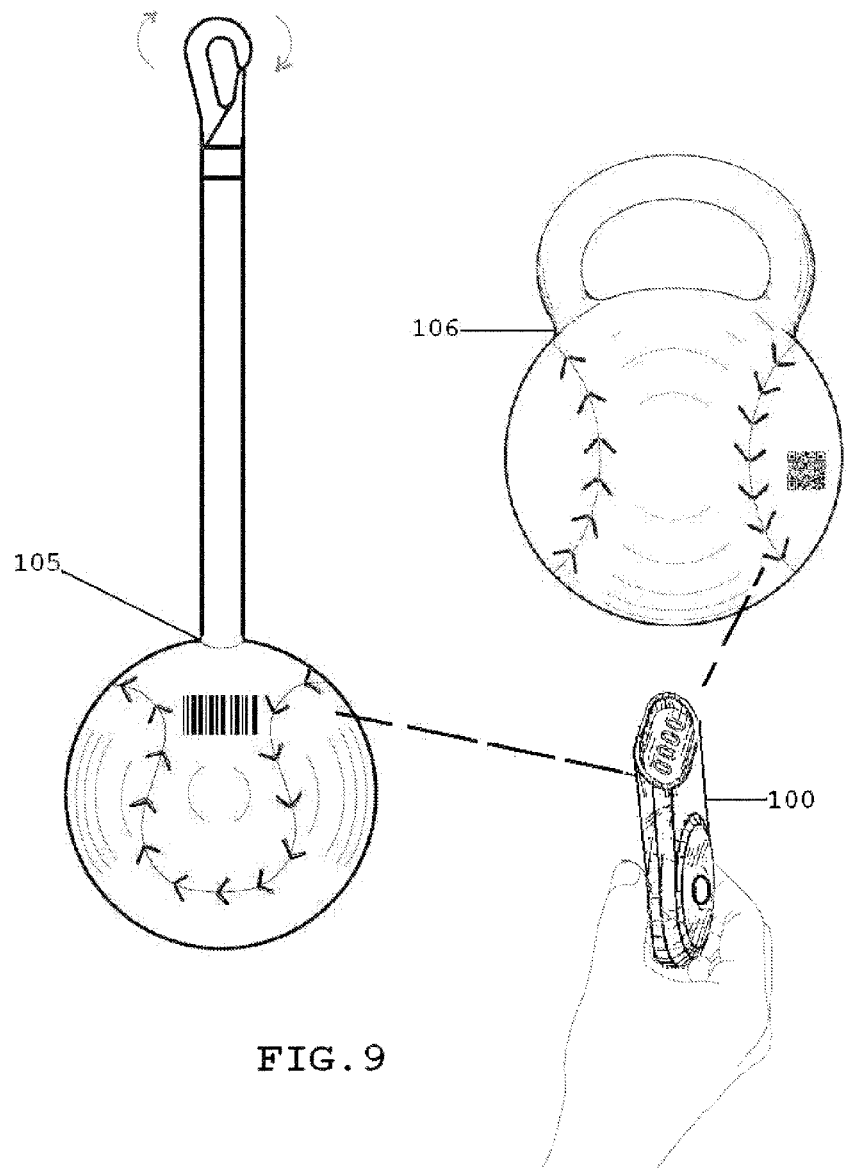
FIG. 9 shows a barcode scan system, in accordance of the invention.

FIG. 9 schematically illustrates a roaming point-of-sale system, which includes a scanning device 100 and In response to the barcode-scan 301 command, the barcode scanner 301 scans baseball tube 105 and baseball kettle 106 the scanning device processor 309. Receives the scanned data and decodes the barcode information and sends the decoded data to the handheld computing device 100 using the athletic performance application/program. In some embodiments, the barcode scanner 301 can be manually activated by a manual scanner activation button 317, which also causes the scanning device to scan and decode the barcodes and send the decoded data to the handheld computing device.

Figure 10:
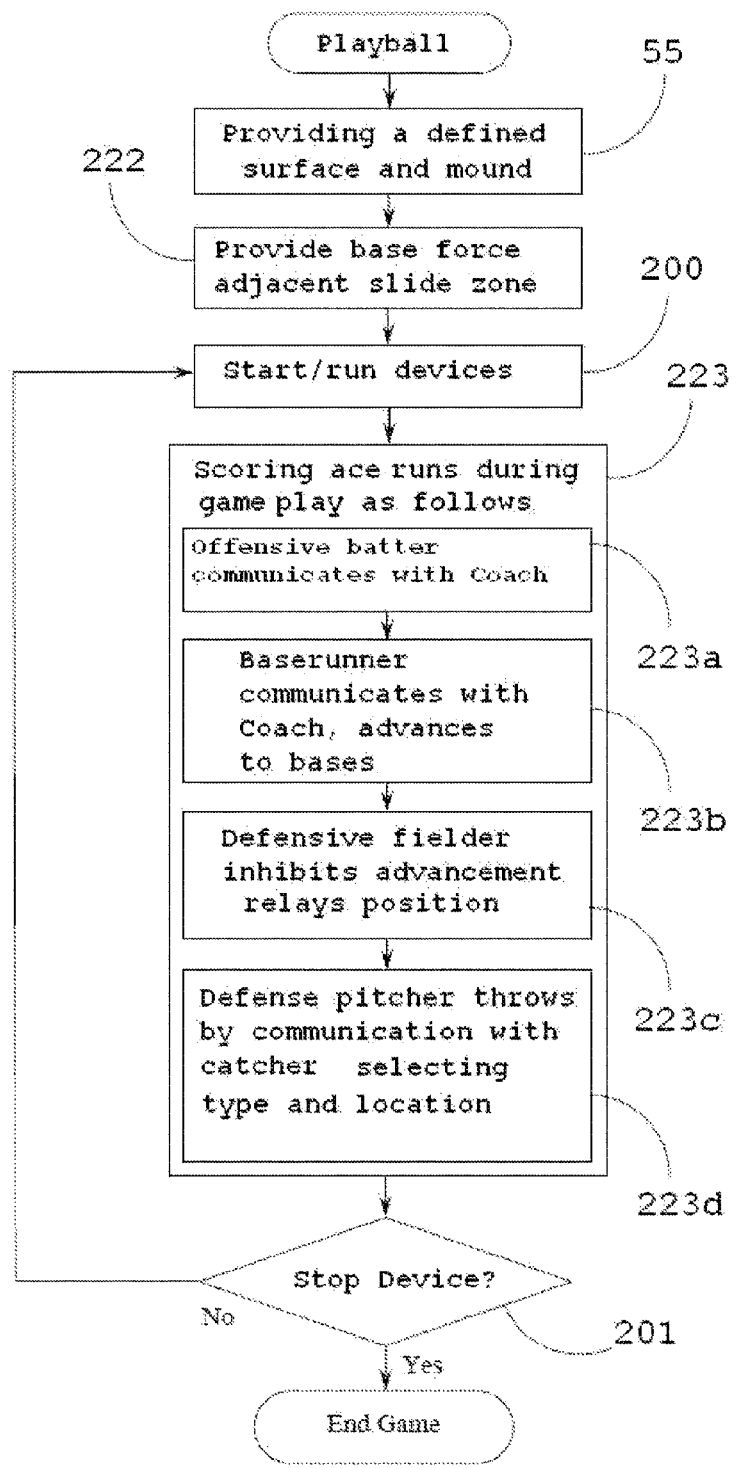
FIG. 10 is a flow chart of the game systems present invention.

FIG. 10 is a flowchart diagram showing a high level sequence of steps that begin by start/run the device 200 and stop the device 201. The relay flow is associated with the game method of play of the present invention. One goal of the device 200,201 communication rendered game method of play of the present invention is to provide the pitcher with an opportunity to maintain performance endurance throughout the shortened length contest. Play ball on a defined provided playing surface 60 with a provide base force adjacent slide zone 222. By delivering quality pitches, and limiting the number of pitch attempts to each offensive batter who communicates with coach 223*a*. The object of the competition is to advance offensive players by sequential baserunners communicating with coach, advances to base 223*b* from base. Where defensive fielders inhibit advancement, relays position 223*c*. Inhibit scoring by obtaining three outs per inning advancement while accumulating outs and progress score aces or runs 223 until end game. This is reflected by a game rule wherein the defensive pitcher throws by communication with catcher, selecting type and location of is pitch 223*d* for the game. A defensive fielder 90 limits long stays in the field and promotes aerobic activity employing a positions range and a greater area to cover defensively. The ball utilized provides greater bounce and requires higher concentration to field and/or defend. The pitcher's mound 55 projects the pitcher as the center of action and creates a downward plane of projection towards the batter. A designated fielder 90 player is allowed to field defensively at least one out per inning.

Figure 11:
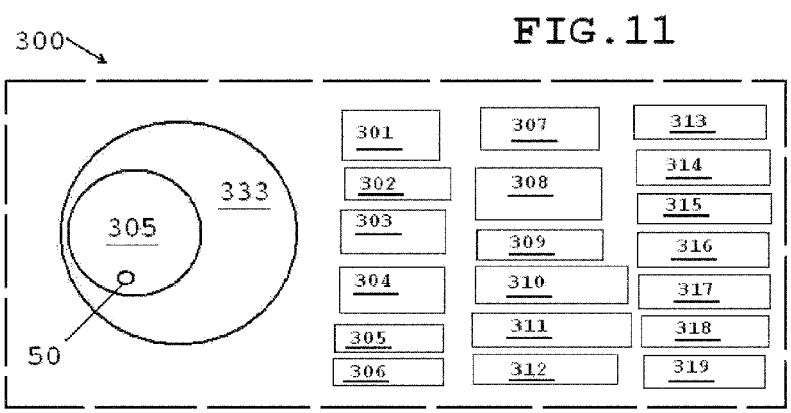
FIG. 11 is a simplified block diagram of a sport device in accordance with an embodiment of the present invention.

FIG. 11 Sport device 300 may include a processor 309 for controlling the smart device's functions. In the illustrated embodiment, processor 309 can be provided in earphone 102. In other embodiments, processor 309 can be located anywhere in sport device 300. Processor 309 can be electrically coupled to the other components of sport device 300 through circuit boards and/or cables. Processor 309 may facilitate wireless communications with a host device in conjunction with transceiver 310 and antenna 318. For example, processor 309 can generate signals for wireless transmission and process received wireless signals, in accordance with the aforementioned BLUETOOTH® protocol or other communications standard. In addition to facilitating wireless communications, processor 309 may coordinate the operation of the various components of sport device 300. For example, processor 309 may control the charging of a battery 305 or the operation of a display 316 system.

As discussed above, the presence of microphone 315 may allow the provision of a voice-command 308 interface (controlled, e.g., by processor 309) to replace or supplement the various switches, etc., described above. In addition, processor 309 can adjust the volume level, once set by the user, to accommodate changes in ambient noise levels as detected by microphone 315. Sport device 300 also includes battery 305. Battery 305 may provide electrical power to components of sport device 300. Charging circuitry may also be provided to charge battery 305 when an external power supply is connected to sport device 300.

Media player 311 circuitry 300 may also be able to make sound recordings for storage in memory 306. The source of sound for such recordings may be microphone 315, allowing the user to record voice memoranda, etc., and also may include sound played back through speaker 307. In the latter case, where both speaker 307 and microphone 315 may be sources of sounds for recording, the user may be able to record telephone conversations when the sport device 300 is being used for conducting a conversation over an associated telephone. In either case, a further button 317 may be provided to initiate the recording mode, or the recording mode may be one more mode through which the aforementioned single button 317 may cycle.

Sport device 300 also includes a communication terminal for communicating with a host device. The communication terminal may be configured for wired or wireless connections. In the illustrated embodiment, the communication terminal is antenna 318 that supports wireless connections, such as the aforementioned BLUETOOTH® protocol. Antenna 318 may be located internal to primary housing 110 or earphone 102. If primary housing 110 or earphone 102 is not formed from a radio-transparent material then a radio-transparent window may be provided. In the illustrated embodiment, antenna 318 is located at one end of the sport device 300.

Sport device 300 improvements also includes microphone 315 for capturing speech provided by the user. The microphone 315 is typically located internal to primary housing 110. For example, the ports may be placed at the seam between the connector assembly and the primary housing. Similarly, any connector 313 may be covered by a removable cap 101. This can be accomplished, for example, through micro perforations in primary housing 110. The micro perforations allow light to pass through, but are so small that they are undetectable to a user.

The system also includes a transceiver 310 which is connected to the microphone. In one embodiment, the system includes a protective box 110 secured to the baseplate and a cover removably attached creating a protective box 110. Sealing material is placed between the box and the protective helmet shell. The transmitter 310 is housed within the protective box 110 such that the transmitter 310 is protected from moisture and dust. Sport device 300 can also include support circuitry for the aforementioned components. For example, this may include circuit boards, various electrical components, processors 309 and controllers 314. The support circuitry 319 can be placed inside primary housing 110 and/or earphone 102. In one embodiment, the support circuitry 319 can be split or divided between the two locations in order to make a more compact device, i.e., the various electronics are distributed among volumes as needed. In order to further save space, the electronics may be stackable. In one embodiment, the electronics are placed on a circuit 319 board with one or more flexible portions so that a stack is created by folding or bending the circuit 319 board. The circuit 319 boards can even be completely flexible to fit within the confined spaces of sport device 300.

Figure 12:
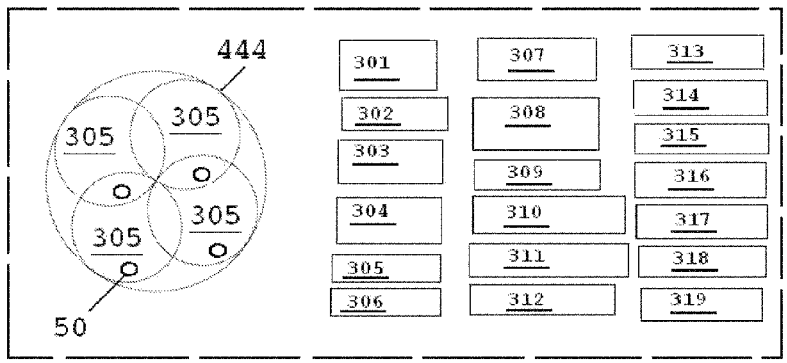
FIG. 12 is another simplified block diagram of a sport device in accordance with an embodiment of the present invention.

FIG. 11 and FIG. 12 The electronic components of mobile terminal 300 and 400 receive power from a power unit 333 and 444. For convenience, bold broken-line arrows are used to show housing in FIG. 11 and FIG. 12. solid line arrows are used to show signal flows. Power unit 333 includes a rechargeable battery 305 housed within a energy extractor ("EE") assembly. Whereas, Power unit 444 includes multiple rechargeable battery 305 housed within a energy extractor ("EE") assembly In more detail below, EE extractor includes multiple quartz piezoelectric 505 elements that generate voltages in response to movement of mobile terminal 300 and 400. Electrical energy output from these piezoelectric elements is received by a power controller 314. Power controller 314 includes electrical circuits that apply the energy output from Orb assembly 333 AND 444 as it is needed. When the electrical load of components in mobile terminal 11&12 is higher, controller 314 uses energy from Orb assembly 333 to help satisfy that load. When the electrical load of mobile terminal is lower, controller 314 applies the energy from ORB assembly 333 and 444 to battery 305 so as to recharge battery 305. Controller 314 can also receive power from a conventional AC adapter for charging battery 305.

In operation, as illustrated in FIGS. 4-5 and FIGS. 11-12, is periodically energized by movement to rotate Orb in either a clockwise or counterclockwise direction. The length of time or activity is energized, and the length of time between the period when the battery is energized, will depend on the particular sport device design. As the Orb rotates, the outer end of the disk moves along a 360° circular pathway to push against with forward and rearwardly spinning Upon engagement of the Orb, sport device disk is rotated until carried to the apex or top of the circular pathway. Upon reaching the apex, the gravitational force or counterweight 50 promotes additional oscillation. Sport device movement rapidly rotate on Orb at a rotational speed greater than the speed of rotation of Orb. Counterweight 50 is then carried beyond the bottom or lowest point of the pathway by its momentum to a point near the apex on the opposite side of the pathway. The cycle is repeated through multiple increasing oscillations of the sport device until counterweight 50 stops at the bottom position, or until once again engages to again move counterweight to the top of its circular pathway.

In operation the heart rate monitor sport device 100 is connected to the computer 69 through the BLUETOOTH® or USB coupling means. Workout history data that has been collected by the heart rate monitor and in the memory unit 306 is downloaded to the computer 69. The computer 69 is preferably programmed with the appropriate driver to read workout history data from the heart rate monitor device 100 and also is preferably programmed with software, such the computer 69 is capable of generating a graphical representation of the workout history data. It will be clear to one skilled in the art that the workout history data can be manipulated in any number of ways to generate a number of different geographical representations of the workout heart rate data to provide insight into the user's workout and the users's workout performance.

Figure 13:
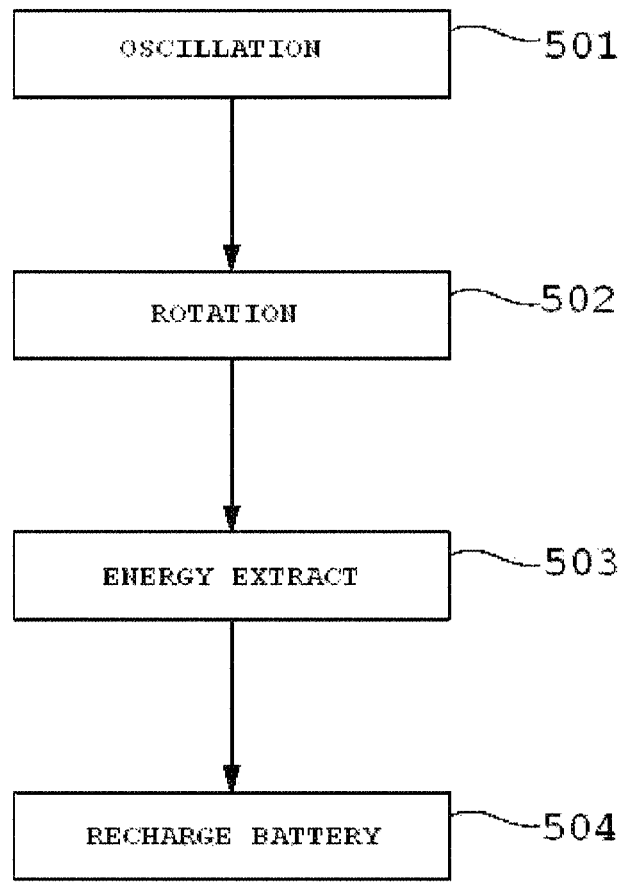
FIG. 13 is a flow chart showing generation of energy using an Orb assembly.

FIG. 13 is a flow chart showing generation of energy using a rotor according to one or more of the above-described embodiments. First, the mobile terminal is oscillated 501. In response to this acceleration, forces are imposed on one or more rotation 502 piezoelectric 505 devices. In response to those forces, the piezoelectric devices output electrical energy, which energy is extracted 503 at a power controller. The power controller then makes this energy available to recharge 504 a battery and/or to electronic components of the mobile terminal. Although FIG. 13 shows a serial flow of events, it is to be appreciated that the events of blocks 502, 503 and 504 occur substantially instantaneously upon acceleration of the mobile terminal.

Certain modifications and improvements will occur to those skilled in the art upon a reading of the foregoing description. It should be understood that all such modifications and improvements have been deleted herein for the sake of conciseness and readability but are properly within the scope of the following claims.

PREFERRED ALTERNATE EMBODIMENTS

In an embodiment of the present invention, the sport device can accept data from one or more physiological sensors, along with data from one or more other sensors that track the user's movements. The movement sensors 104,312 can be disposed within the electronic device itself or attached to or incorporated within the user's helmet 80. The sport device will be configured to condition the data from the physiological sensors 104,312 using the data from the movement sensors. For example, because the physiological sensor may contain anomalies due to the user's movements, the electronic device can identify the anomalies based on data indicative of the user's movements and thereafter remove or filter out their effects before relay to computer application program.

In one embodiment of the present invention, earphone 102 also can be equipped with one or more physiological sensors 104,312. For example, sensors 104,312 can include one or more infrared 507 photodetectors for tracking the user's temperature, heat flux, heart rate and barcode scan 301. From infrared radiation in the user's ear, sensors 104,312 can detect minute temperature variations due to the user's heart beats. Heart rate can be calculated based on the time between beats and the user's temperature can be set as the "DC component" of the detected temperature distribution. Other sensors 104, 312 also can be used for tracking the same physiological metrics or different physiological metrics. In one embodiment of the present invention, one sensor 104,312 can be centered with respect to acoustical aperture 109 to ensure that the sensor 104,312 receives a sufficient infrared signal regardless of how the user positions earphone 102 in the user's ear. Alternatively, speaker 307 can be centered with respect to acoustical aperture 109 and two or more of the same sensors 104,312 can be positioned around the periphery of speaker 307. This can increase the likelihood that at least one sensor 104,312 can obtain a sufficient infrared 507 signal regardless of how the user positions earphone 102 in the user's ear.

Electronic device 100,300,400 can have one or more antennas 318 for wirelessly communicating with a data network and/or with one or more. For example, the electronic device can include one or more antennas for communication with Bluetooth 340-enabled devices, WiFi network, cellular network (GPS 360), radio frequency network 330, or any combination thereof. In one embodiment of the present invention, antenna (s) 318 can permit a user to stream or otherwise download audio and/or visual 316 media to entertain and motivate the user during performance of an activity. Removably attached, electronic device 100,300,400 also can be any electronic device suitable for processing signals from sensors that track a user's performance metrics during physical activity. The Helmet smart device offers three useful functionalities—Bluetooth, Memory 306, and wired: four different Bluetooth Modes are available (Master, Slave, USB HID, iOS) to communicate between PC, mobile phone and PDA; in Memory 306 Mode, it can store up to 500 barcode 301 readings with time stamps for later download; in Wired Mode, with the supplied USB cable (supplied) connected, it can be used as a tethered scanner, transferring data to and from internal flash memory 306, as well as charging the device.

Thus it is seen that a wireless sport device with integrated media player and/or recorder has been provided. It will be understood that the foregoing is only illustrative of the principles of the invention, and that various modifications can be made by those skilled in the art without departing from the scope and spirit of the invention, and the present invention is limited only by the claims that follow.

I claim:

1. An electronic baseball game system, comprising:
one or more electronic baseball bases configured to be positioned on a baseball field, wherein the one or more electronic baseball bases includes an electronic device;
an electronic sport helmet, comprising:
a helmet shell made of a rigid material having an outer surface and an inner surface,
the inner surface forms a cavity to at least partially cover a head of a user; and
a wireless sport device secured to the helmet shell and configured to generate and manage data, the wireless sport device comprising:
a processor for controlling functions of the wireless sport device and processing the data;
a transmitter for sending and receiving the data generated by the wireless sport device;
a battery for providing power to the wireless sport device;
a microphone for generating audio data from the user, wherein the microphone is housed in a channel within the helmet shell;
a global positioning system receiver for tracking the location of the electronic sport helmet, wherein, when the electronic sport helmet is worn by the user, wherein when the one or more of the electronic baseball bases is proximate to the user wearing the electronic sport helmet, the wireless sport device is configured to generate speed data and position data of the user;
an infrared physiological sensor integrated in the wireless sport device, the infrared physiological sensor measures changes in light through the user's skin to generate heart rate data;
a speaker for outputting audio to the user;
a camera for outputting video data representing a field of view of the user; and
a power unit for supplying power to the wireless sport device, and for recharging the battery, comprising:
a chamber within the power unit for receiving the battery, wherein the battery is free to move within the chamber, the battery further comprising a counterweight;
a power controller configured to manage electrical load for the wireless sport device;
a first piezoelectric element and a second piezoelectric element each couple the power unit to the power controller; the first piezoelectric element receives a first acceleration force imposed by the battery moving within the chamber when the wireless sport device oscillates along a first axis; the second piezoelectric element receives a second acceleration force imposed by the battery moving within the chamber when the wireless sport device oscillates along a second axis, wherein the first axis is adjacent the second axis; such that the power controller receives electrical energy output from the first piezoelectric element and the second piezoelectric element in response to the first acceleration force and the second acceleration force to manage power available for the wireless sport device and distributing power to recharge the battery.

2. An electronic sport helmet comprising:
a helmet shell made of a rigid material having an outer surface and an inner surface, the inner surface forms a cavity to at least partially cover a head of a user; and
a wireless sport device secured to the helmet shell and configured to generate and manage data, the wireless sport device comprising:
a processor for controlling functions of the wireless sport device and processing the data;

a transmitter for sending and receiving the data generated by the wireless sport device;

a battery for providing power to the wireless sport device;

a microphone for generating audio data from the user, wherein the microphone is housed in a channel within the helmet shell;

a global positioning system receiver for tracking the location of the electronic sport helmet, wherein, when the electronic sport helmet is worn by the user, the wireless sport device is configured to generate speed data and position data of the user;

an infrared physiological sensor integrated in the wireless sport device, the infrared physiological sensor measures changes in light through the user's skin to generate heart rate data;

a speaker for outputting audio to the user;

a camera for outputting video data representing a field of view of the user; and a power unit for supplying power to the wireless sport device, and for recharging the battery, comprising:

a chamber within the power unit for receiving the battery, wherein the battery is free to move within the chamber, the battery further comprising a counterweight;

a power controller configured to manage electrical load for the wireless sport device;

a first piezoelectric element and a second piezoelectric element each couple the power unit to the power controller; the first piezoelectric element receives a first acceleration force imposed by the battery moving within the chamber when the wireless sport device oscillates along a first axis; the second piezoelectric element receives a second acceleration force imposed by the battery moving within the chamber when the wireless sport device oscillates along a second axis, wherein the first axis is adjacent the second axis; such that the power controller receives electrical energy output from the first piezoelectric element and the second piezoelectric element in response to the first acceleration force and the second acceleration force to manage power available for the wireless sport device and distributing power to recharge the battery.

* * * * *